(12) United States Patent
Boleslawski

(10) Patent No.: US 9,834,387 B2
(45) Date of Patent: Dec. 5, 2017

(54) CLEANING SYSTEM FOR DRUM CONVEYOR OF APPARATUS FOR FEEDING FILTER SEGMENTS TO MULTI-SEGMENT FILTER MANUFACTURING APPARATUS AND METHOD OF CLEANING OF DRUM CONVEYOR

(71) Applicant: Philip Morris Products S.A., Neuchatel (CH)

(72) Inventor: Andrzej Boleslawski, Radom (PL)

(73) Assignee: Philip Morris Products S.A., Neuchatel (CH)

( * ) Notice: Subject to any disclaimer, the term of this patent is extended or adjusted under 35 U.S.C. 154(b) by 579 days.

(21) Appl. No.: 14/384,159

(22) PCT Filed: Mar. 13, 2013

(86) PCT No.: PCT/PL2013/050008
§ 371 (c)(1),
(2) Date: Sep. 10, 2014

(87) PCT Pub. No.: WO2013/147631
PCT Pub. Date: Oct. 3, 2013

(65) Prior Publication Data
US 2015/0068376 A1 Mar. 12, 2015

(30) Foreign Application Priority Data

Mar. 26, 2012 (PL) .......................................... 398616

(51) Int. Cl.
*B26D 7/18* (2006.01)
*B65G 45/24* (2006.01)
*A24D 3/02* (2006.01)

(52) U.S. Cl.
CPC ............ *B65G 45/24* (2013.01); *A24D 3/0254* (2013.01); *B26D 7/1863* (2013.01); *Y10T 83/0453* (2015.04); *Y10T 83/207* (2015.04)

(58) Field of Classification Search
CPC .... A24D 3/0254; B26D 7/1863; B65G 45/24; Y10T 83/207; Y10T 83/0543; B08B 9/0436; B08B 9/0552
See application file for complete search history.

(56) References Cited

U.S. PATENT DOCUMENTS

| 3,311,008 A | 3/1967 | Schubert |
| 3,405,579 A | 10/1968 | London |

(Continued)

FOREIGN PATENT DOCUMENTS

| DE | 1272795 B | 7/1968 |
| DE | 1481378 A1 | 2/1969 |

(Continued)

OTHER PUBLICATIONS

Earlier search report in priority application No. PL 398616 dated Sep. 4, 2012. (1 page—see entire document).

(Continued)

*Primary Examiner* — Katelyn Whatley
(74) *Attorney, Agent, or Firm* — Mueting, Raasch & Gebhardt, P.A.

(57) ABSTRACT

The object of the application is a cleaning system of a drum conveyor of a filter segment feeding apparatus in the tobacco industry wherein a transport drum (3) comprises a plurality of discs (4) on the circumferential surface of which concavities (5) are formed whereas the concavities of the individual discs are positioned relative to one another so that together they form channels (6) receiving filter rods (1), where in the said channels (6) the filter rods (1) are transported during cutting, whereas the borders of adjacent discs (Continued)

Figure 1:
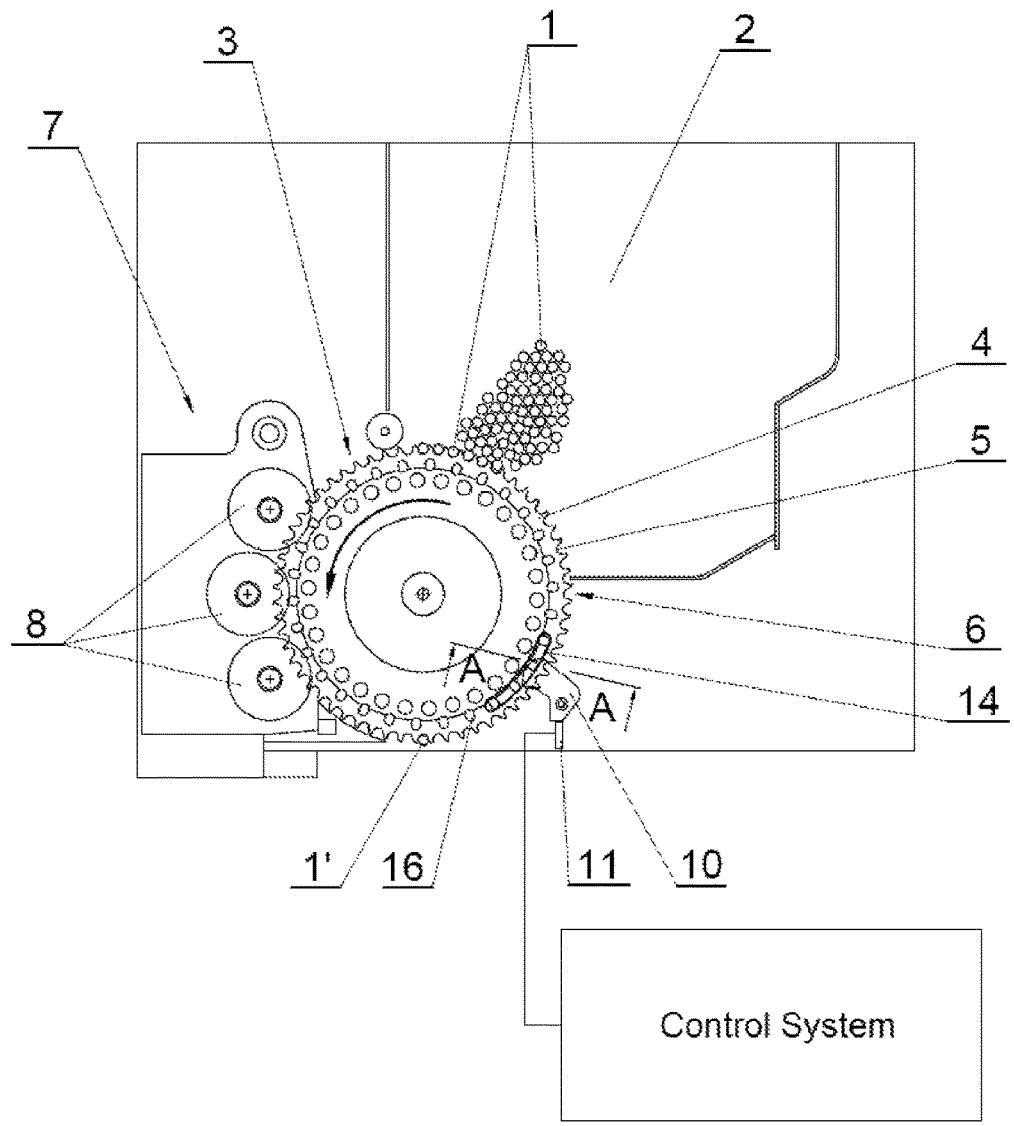

(4) do not contact one another and in this way they form circumferential grooves (9). The discs (4) have passages (12) discharging the dirt, the circumferential grooves (9) have a connection with the passages (12) discharging the dirt, and the system comprises a vacuum channel (15) receiving the dirt having a connection with the passages (12) discharging the dirt in the discs (4).

10 Claims, 3 Drawing Sheets

(56) References Cited

U.S. PATENT DOCUMENTS

| | | | | |
|---|---|---|---|---|
| 5,875,824 | A * | 3/1999 | Atwell | A24D 3/0225 |
| | | | | 141/125 |
| 6,062,228 | A | 5/2000 | Loercks | |
| 8,662,088 | B2 | 3/2014 | Owczarek | |
| 8,869,969 | B2 | 10/2014 | Cielikowski et al. | |
| 8,925,708 | B2 | 1/2015 | Cielikowski et al. | |
| 8,967,370 | B2 | 3/2015 | Cielikowski | |
| 9,004,261 | B2 | 4/2015 | Cielikowski et al. | |
| 9,061,835 | B2 | 6/2015 | Gielniewski | |
| 9,161,571 | B2 | 10/2015 | Sikora | |
| 9,332,785 | B2 | 5/2016 | Hoffmann | |
| 2009/0145449 | A1 | 6/2009 | Cieslikowski et al. | |
| 2011/0011412 | A1 * | 1/2011 | Yanchev | A24D 3/0254 |
| | | | | 131/285 |
| 2012/0157278 | A1 | 6/2012 | Cieslikowski et al. | |
| 2012/0240950 | A1 * | 9/2012 | Laplante | A24C 5/06 |
| | | | | 131/289 |
| 2013/0087056 | A1 | 4/2013 | Chojnacki | |
| 2014/0011652 | A1 | 1/2014 | Cieslikowski et al. | |
| 2014/0097107 | A1 | 4/2014 | Zagajska | |
| 2014/0123826 | A1 | 5/2014 | Cieslikowski et al. | |
| 2014/0158252 | A1 | 6/2014 | Owczarek | |
| 2014/0235416 | A1 | 8/2014 | Lisowski et al. | |
| 2015/0013519 | A1 | 1/2015 | Cieslikowski et al. | |
| 2015/0047137 | A1 | 2/2015 | Gielniewski | |
| 2015/0114543 | A1 | 4/2015 | Riedel | |
| 2015/0114988 | A1 | 4/2015 | Riedel | |
| 2015/0342247 | A1 | 12/2015 | Ugrewicz | |
| 2016/0000142 | A1 | 1/2016 | Stanikowski et al. | |

FOREIGN PATENT DOCUMENTS

| | | |
|---|---|---|
| DE | 102006008959 A1 | 8/2007 |
| EP | 0755636 A1 | 1/1997 |
| EP | 1468617 A2 | 10/2004 |
| EP | 1767107 A1 | 3/2007 |
| EP | 2363029 A1 | 9/2011 |
| GB | 876732 A | 9/1961 |
| GB | 915203 A | 1/1963 |
| GB | 971491 A | 9/1964 |
| GB | 971492 | 9/1964 |
| GB | 1029127 A | 5/1966 |
| GB | 1179683 A | 1/1970 |
| GB | 1578737 A | 11/1980 |
| GB | 1578738 A | 11/1980 |
| PL | 383995 A1 | 6/2009 |
| PL | 392134 A1 | 2/2012 |
| PL | 215954 | 2/2014 |
| RU | 1834648 A3 | 8/1993 |
| RU | 2153828 C2 | 8/2000 |
| SU | 786851 A3 | 12/1980 |
| WO | 2006000918 A2 | 1/2006 |
| WO | 2009074540 A1 | 6/2009 |
| WO | 2010006841 A1 | 1/2010 |
| WO | 2011008802 A2 | 1/2011 |
| WO | 2011122971 A2 | 10/2011 |
| WO | 2012021078 A1 | 2/2012 |

OTHER PUBLICATIONS

International search report in international application No. PCT/PL2013/050008, dated May 10, 2013. (4 pages—entire document).

Written Opinion of the International Search Authority in international application No. PCT/PL2013/050008, dated May 10, 2013. (4 pages—see entire document).

Protocol of the Oral Proceedings dated Jan. 30, 2003 in the opposition proceedings against patent EP 0 755 636 B1 (application No. 96 112 055.7) (D15).

Decision of the Opposition Division in the opposition proceedings against patent EP 0 755 636 B1 (application No. 96 112 055.7) dated Jan. 30, 2003 (with Annex) (D16).

Hauni, PROTOS 80C Service manual, HWR.3205.003.00.en, Germany, dated Jan. 2008.

Hauni, PROTOS 2 technical drawing 2050-0-0-DS, Germany, not dated.

Hauni, PROTOS 2 technical drawing 2050-1-0-DS, Germany, not dated.

* cited by examiner

CLEANING SYSTEM FOR DRUM CONVEYOR OF APPARATUS FOR FEEDING FILTER SEGMENTS TO MULTI-SEGMENT FILTER MANUFACTURING APPARATUS AND METHOD OF CLEANING OF DRUM CONVEYOR

The subject matter of the application is a cleaning system for a drum conveyor of an apparatus for feeding filter segments to an apparatus for manufacturing multi-segment filters used in the tobacco industry and a method of cleaning of drum conveyor.

In multi-segment filter manufacturing machines there is a need of feeding plurality of different filter segments from multiple feeding devices. The filter segments in the form of full cylinders, e.g. from cellulose acetate or other filter materials or tubular articles used in the tobacco industry, are formed by cutting rods of the length of multiple segments. Usually, the rods are cut on drum conveyors using a plurality of circular knives. Drum conveyors of this type are known from the documents: GB876732, GB915203, GB971491, GB971492, GB1578737, GB1578738, EP1767107, WO2009/074540. To ensure correct cutting of the rods the cutting edges of the knives sink beneath the surface of the bottom of each of the channels in which the cut rods are transported. To make such location of the cutting edges possible, circumferential grooves dividing the surfaces of the channels into multiple parts and sinking beneath these surfaces are formed on the drums. In the solutions known in the state of the art the transport drum comprises a plurality of discs whereas circumferential grooves between adjacent discs are formed, the borders of the discs do not contact one another, and for transporting the rods the concavities formed in the discs are used so that together they form channels for the rods. During the operation of the rod cutting unit the surfaces of the channels get dirty with both the dust and the particles of cut material. The accumulation of dirt within the grooves may result in disturbances in the operation of the unit, which is why there is a need for a solution enabling cleaning of these grooves, but the abovementioned documents have not revealed any methods of drum cleaning.

The subject matter of the invention is a cleaning system for a drum conveyor of an apparatus for feeding filter segments in the tobacco industry where a transport drum comprises a plurality of discs on the circumferential surface of which concavities are formed whereas the concavities of respective discs are positioned relative to one another so that together they form channels receiving the filter rods, in the said channels the filter rods are transported during cutting whereas the borders of adjacent discs do not contact each other and in this way they form circumferential grooves. The cleaning system is characterized in that the discs have passages discharging the dirt, circumferential grooves have a connection with the passages discharging the dirt, and the system comprises a vacuum channel receiving the dirt having a connection with the passages discharging the dirt in the discs.

A system according to the invention is characterized in that it comprises cleaning means inserted into circumferential grooves for tearing off the dirt from the walls of the circumferential grooves.

A system according to the invention is characterised in that the cleaning means are designed as movable and deflect if they encounter pieces of dirt which have strongly adhered to the groove walls.

A system according to the invention is characterised by comprising a cleaning means position sensor and a control system which switches off the unit in which the cleaning system is installed if the position sensor signals a deflection of the cleaning means.

The subject matter of the invention is also a method of cleaning a drum conveyor of an apparatus for feeding filter segments in the tobacco industry where the drum consists of a plurality of discs on the circumferential surface of which concavities are formed whereas the concavities of respective discs are positioned to one another so that together they form channels receiving the filter rods, in the said channels the filter rods are transported during cutting whereas the borders of adjacent discs do not contact each other and in this way they form circumferential grooves.

A method according to the invention is characterized in that the dirt being formed during rod cutting is discharged by vacuum to circumferential grooves, and next the dirt is discharged by vacuum to passages made in the discs, and then the dirt is discharged by vacuum to channels receiving the dirt.

A method according to the invention is characterized in that the dirt which has adhered to the walls of circumferential grooves is mechanically removed by means of movable cleaning means inserted into the circumferential grooves.

A method according to the invention is characterized in that the position of movable cleaning means is controlled and the unit in which the cleaning system is installed is switched off if the position sensor signals a deflection of the cleaning means.

The use of the cleaning system allows very effective cleaning of the drum from the dust and the particles of material of cut filter rods because they are received when tearing off and just after tearing them off the surface of the grooves of the drum. A plurality of channels disposed on the drum allows a uniform cleaning of the drum during the operation.

Figure 2:
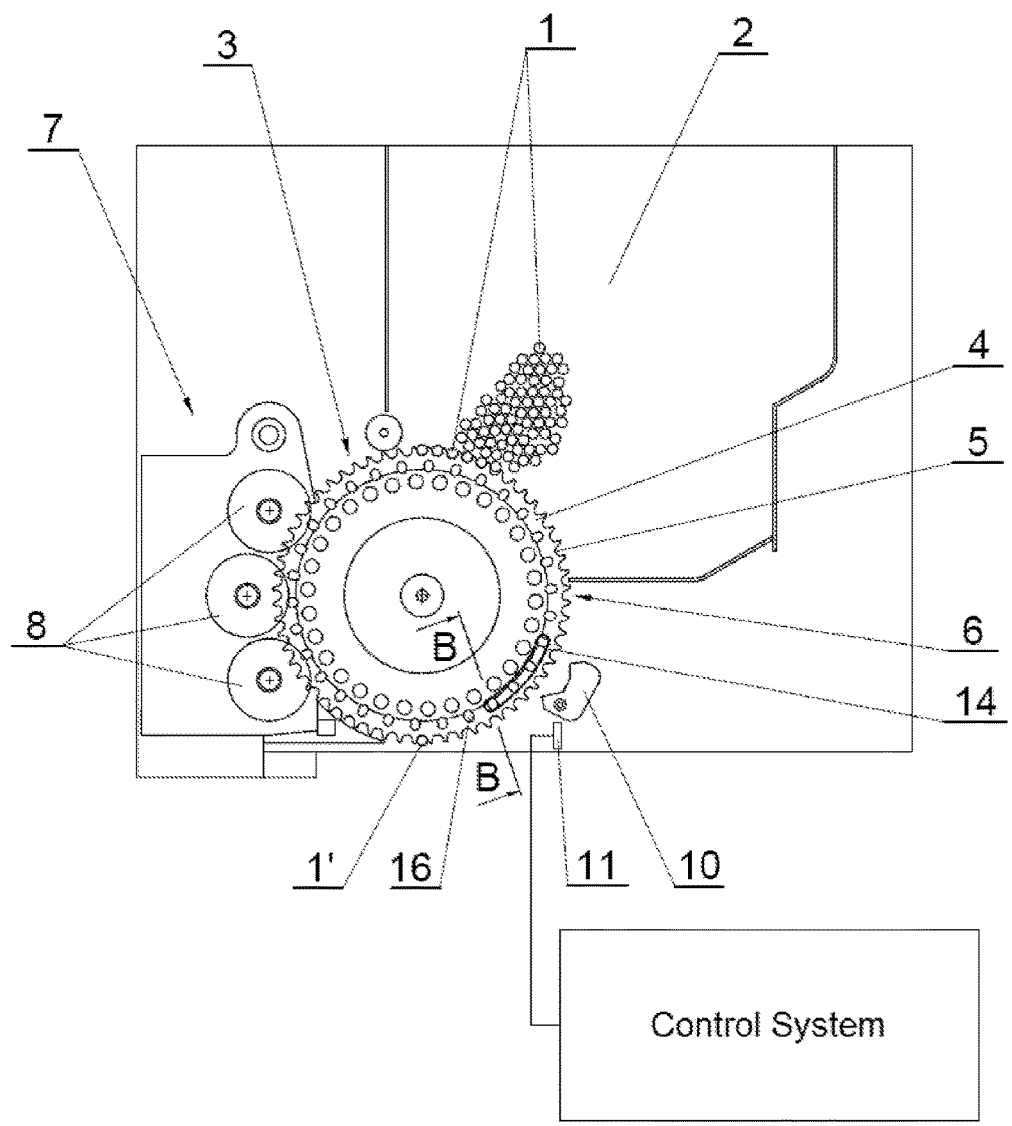
Figure 3:
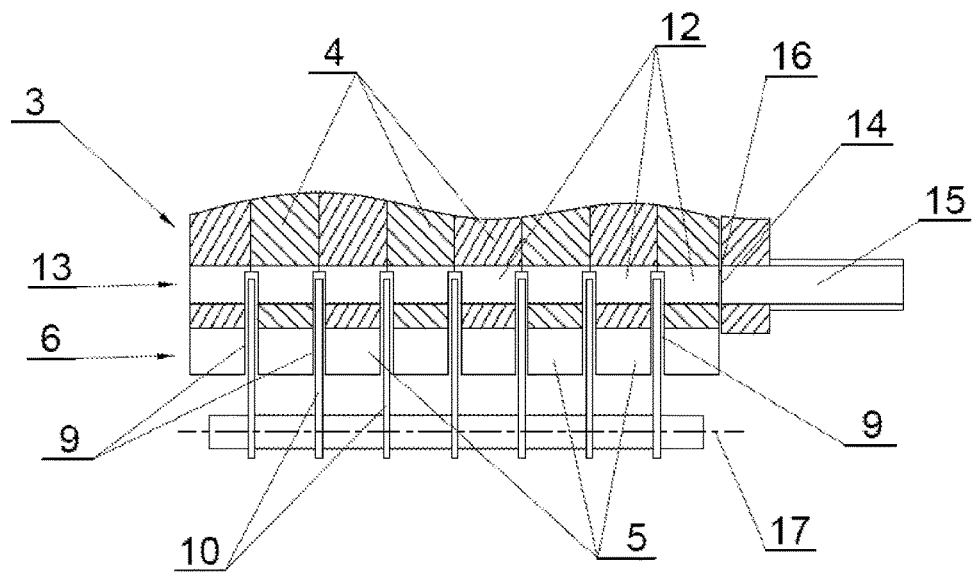
Figure 4:
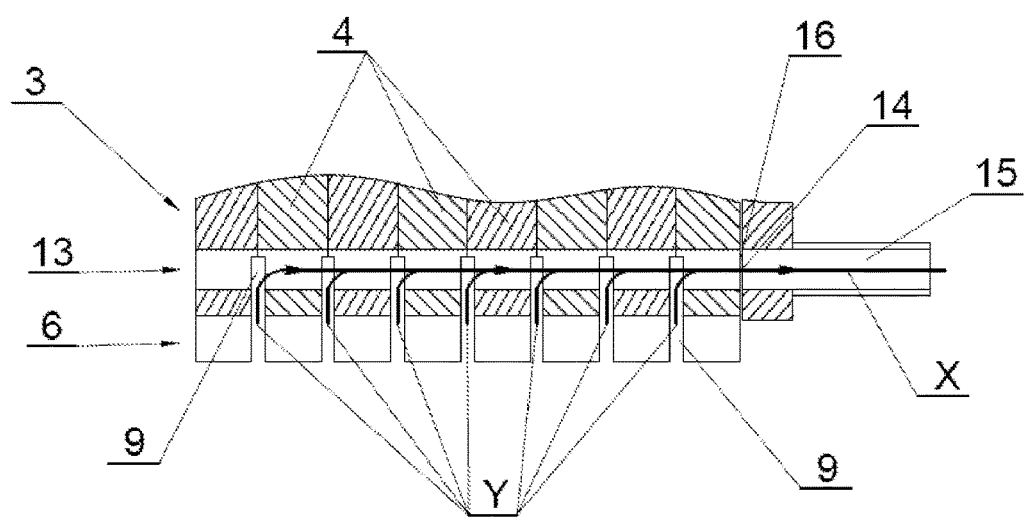

The object of the invention has been presented in a preferred embodiment in a drawing in which:

FIG. 1 shows a fragment of a filter segment feeding apparatus during the operation of the apparatus, FIG. 2 shows a fragment of a filter segment feeding apparatus after stopping the operation, FIG. 3 shows a cross-section A-A of FIG. 1 through a channel for receiving the rods and a channel discharging the dirt, FIG. 4 shows a cross-section B-B of FIG. 2 through a channel for receiving the rods and a channel discharging the dirt.

FIG. 1 shows a fragment of a filter segment feeding apparatus. The filter rods 1 which during the operation of the apparatus are cut into filter segments are accumulated in a hopper 2. Underneath the hopper 2 a rotatable transport drum 3 comprising a plurality of discs 4 is situated which have concavities 5 formed on their circumferential surfaces. The concavities are positioned relative to one another so that together they form channels 6 receiving the filter rods 1. With the transport drum 3 cooperates a cutting head 7 provided with circular knives 8 used for cutting the filter rods 1 into segments during the transport of the filter rods 1 on the transport drum 3. The circular knives 8 are situated in relation to the transport drum 3 so that their cutting edges sink into circumferential grooves 9 formed between the borders of individual discs 4 (FIG. 3). The cleaning means 10 (e.g., a plurality of cleaning plates 10) the position of which is controlled by a sensor 11 is also inserted into these grooves. For reasons of simplification, the drive systems of the drum and the cutting head have not been shown.

FIG. 3 shows a cross-section through a receiving channel 6 on a transport drum 3 marked in FIG. 1 as A-A. The discs 4, adjacent to one another, forming the transport drum 3 adjoin one another outside of the border, where they do not contact one another, and in this way the circumferential grooves 9 are formed. Each of the discs 4 has a plurality of passages 12 discharging the dirt made in the border area of the discs 4 whereas the passages are disposed in such a way that they cross the circumferential grooves 9. In addition, the passages 12 discharging the dirt made in the successive discs 4 are situated relative to one another so that they form a channel 13 discharging the dirt. In the transport drum 3, multiple channels 13 discharging the dirt are formed which during the rotation of the transport drum 3 successively pass an arch-shaped inlet passage 14 to a receiving vacuum channel 15 and on a certain angular way depending on the length of the inlet passage 14 each successive channel 13 discharging the dirt through an outlet passage 16 has a connection with the channel 15 receiving the dirt. FIG. 3 shows cleaning means 10 the function of which is to remove pieces of dirt which can adhere to the walls of the circumferential grooves 9. In an embodiment, the movable cleaning means 10 is designed as deflectable and can rotate around an axis of rotation 17.

During the operation of the filter segment feeding unit the filter rods 1 fed by gravity from a hopper 2 are placed in the channels 6 of the transport drum 3. The transport drum 3, by rotating in the direction shown by the arrow, transports the filter rods 1 through the area of operation of the circular knives 8 of the cutting head 7. The filter rods 1 are successively cut into segments, in the drawing, 1' is the annotation for the filter rod 1 cut into segments which can be fed for further operations. During cutting of the filter rods 1, dust from the filter material of the rods is formed, in addition, particles of this material may tear off. The circumferential grooves 9 situated directly opposite the circular knives 8 have a connection with a plurality of channels 13 discharging the dirt. During the operation of the apparatus, successive discharging channels 13 with their outlet passage 16 move next to the inlet passage 14 to the vacuum channel 15 receiving the dirt. When the channels 13 and 15 have a connection with each other, the dirt from the discharging channel 13 is transferred by vacuum to the receiving channel 15 whereas the dirt is transferred further to a not shown dirt container, e.g. in the form of a dust filter. The disclosed cleaning system according to the invention enables effective discharging of dirt forming in the course of cutting the filter rods from the transport drum 3. During the operation of the apparatus, it may happen that the pieces of dirt adhere to the walls of the circumferential grooves 9. To remove these pieces of dirt, movable cleaning means 10, which is inserted into the circumferential grooves 9, is used. The particles of the filter material torn off by the cleaning means 10 will also be removed by vacuum and transferred to the channel 15 receiving the dirt. However, if in the circumferential groove 9 occurs such a piece of dirt which cannot be removed by the cleaning means, the movable cleaning means is deflected or otherwise moved away, which has been shown in FIG. 2, in particular it concerns particles which can be soiled with glue or other substances contained in the filter or the paper wrapping the filter rod causing the adherence to the walls. A change of position of the cleaning means 10 will be detected by a sensor 11 which will send a signal to the control system in order to switch off the unit or the entire apparatus.

FIG. 4 shows a cross-section through a channel 6 receiving the filter rods 1 without the cleaning means 10 marked as B-B in FIG. 2. Both the dust and the material particles being formed during cutting, when passing in the direction of an outlet passage 16 of a discharging channel 13 and before an inlet passage 14 of a receiving channel 15, are subjected to a difference in pressure between a pressure inside the receiving channel 15 occurring for example at the point X and a pressure within the receiving channel 6 occurring for example at the points Y. The difference in pressure causes an airflow shown in the diagrammatic form by a thick line. The airflow shown occurs during the removal of dirt from the circumferential grooves 9 by the cleaning means 10 as well as just after the removal of dirt, which ensures high efficiency of the cleaning system.

The invention claimed is:

1. A cleaning system of a drum conveyor of a filter segment feeding apparatus, the cleaning system comprising:
   a transport drum formed by a plurality of discs, each disc comprising a circumferential surface defining a plurality of concavities, wherein the concavities of individual discs are positioned adjacent to one another to form receiving channels for transporting filter rods, and wherein circumferential grooves are formed between peripheral areas of adjacent discs, the transport drum comprising discharge passages forming a discharge channel extending through the plurality of discs, wherein the circumferential grooves are in connection with the discharge passages; and
   a vacuum channel connectable with the discharge channel and arranged to remove dirt from the plurality of discs through the discharge channel.

2. The cleaning system of claim 1, further comprising a plurality of cleaning plates, each cleaning plate insertable in one of the circumferential grooves and capable of removing dirt from walls of the circumferential groove.

3. The cleaning system of claim 2, wherein the plurality of cleaning plates are movable and deflectable if the cleaning plates encounter pieces of dirt which have strongly adhered to the walls of the circumferential groove.

4. The cleaning system of claim 3, further comprising a cleaning plate position sensor and a control system adapted to switch off the cleaning system if the position sensor signals of deflection of the cleaning plate.

5. The cleaning system of claim 1 further comprising an arch-shaped inlet passage arranged to connect the vacuum channel to a plurality of discharge channels.

6. A method of cleaning a drum conveyor of a filter segment feeding apparatus, the drum conveyor comprising a transport drum formed by a plurality of discs, each disc comprising a circumferential surface defining a plurality of concavities, wherein the concavities of individual discs are positioned adjacent to one another to form receiving channels for transporting filter rods, wherein circumferential grooves are formed between peripheral areas of adjacent discs, and wherein a discharging passage extends through the plurality of discs connecting the circumferential grooves to a vacuum channel,
   the method comprising:
      applying a vacuum to the circumferential grooves via the vacuum channel;
      drawing dirt by the vacuum to the discharging passage; and
      discharging the dirt into the vacuum channel.

7. The method of claim 6, further comprising inserting movable cleaning plates in the circumferential grooves to dislodge dirt adhered to walls of the circumferential grooves.

8. The method of claim 7, further comprising controlling a position of the movable cleaning plates.

9. The method of claim 7 further comprising switching off the cleaning when a position sensor indicates that the movable cleaning plate has deflected from the circumferential grooves.

10. The method of claim 7 further comprising rotating the drum conveyor while cleaning the drum conveyor.

\* \* \* \* \*